United States Patent [19]
Yavorsky et al.

[11] Patent Number: 4,765,507
[45] Date of Patent: * Aug. 23, 1988

[54] PRESSURE VESSEL WITH AN IMPROVED SIDEWALL STRUCTURE

[75] Inventors: William M. Yavorsky, Woodbury; Gary W. Gauer, Cottage Grove, both of Minn.

[73] Assignee: Ecodyne Corporation, St. Paul, Minn.

[*] Notice: The portion of the term of this patent subsequent to Oct. 28, 2003 has been disclaimed.

[21] Appl. No.: 885,300

[22] Filed: Jul. 14, 1986

Related U.S. Application Data

[63] Continuation-in-part of Ser. No. 822,921, Jan. 24, 1986, Pat. No. 4,619,374, which is a continuation of Ser. No. 612,239, May 21, 1984, which is a continuation-in-part of Ser. No. 447,769, Jan. 24, 1983.

[51] Int. Cl.4 ............................................. B65D 25/02
[52] U.S. Cl. .......................................... 220/414; 220/3; 220/83; 220/465; 137/590
[58] Field of Search .................. 220/414, 83, 459, 465, 220/453; 285/211, 192, 196; 137/590

[56] References Cited

U.S. PATENT DOCUMENTS

| | | | |
|---|---|---|---|
| 868,548 | 10/1907 | Griffin | 220/3 |
| 1,855,077 | 4/1932 | Wildt | 220/459 |
| 1,862,153 | 6/1932 | Lee | 285/196 |
| 2,273,736 | 2/1942 | Raymond et al. | 220/3 |
| 2,281,407 | 4/1942 | Bohnsack | 220/459 |
| 3,587,904 | 6/1971 | Harris et al. | 220/3 |
| 3,653,846 | 4/1972 | Kubee et al. | 220/3 |
| 3,662,780 | 5/1972 | Marsh | 220/3 |
| 3,874,544 | 4/1975 | Harmon | 220/3 |
| 3,907,149 | 9/1985 | Harmon | 220/3 |
| 4,191,304 | 3/1980 | Schiedet | 220/3 |

FOREIGN PATENT DOCUMENTS 2639283 3/1978 Fed. Rep. of Germany .......... 220/3

Primary Examiner—Joseph Man-Fu Moy
Attorney, Agent, or Firm—Neuman, Williams, Anderson & Olson

[57] ABSTRACT

A thin-walled pressure vessel having an improved insert. The insert increases the thickness of a portion of a pressure vessel's sidewall to allow the sidewall to accommodate a port. The insert comprises a main body structural member defining an opening through its center. The opening through the body member communicates with openings in an inner liner and an outer shell which comprise the vessel to provide an opening through the sidewall of the vessel. A fitting disposed in pressure contact with the main body member circumjacent the opening lines the walls of the opening in the body member and engages a portion of the main body member with an annual flange to restrain expansions of the body member at increasing temperatures while defining a port which maintains a constant shape and size for receiving other fittings.

24 Claims, 2 Drawing Sheets

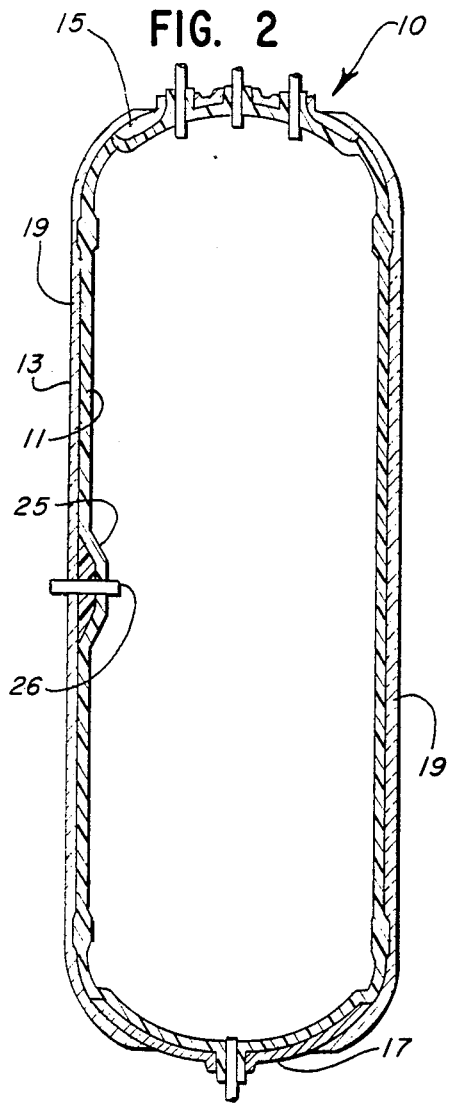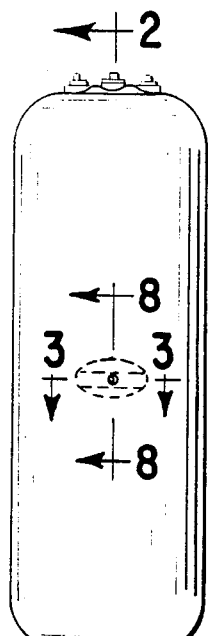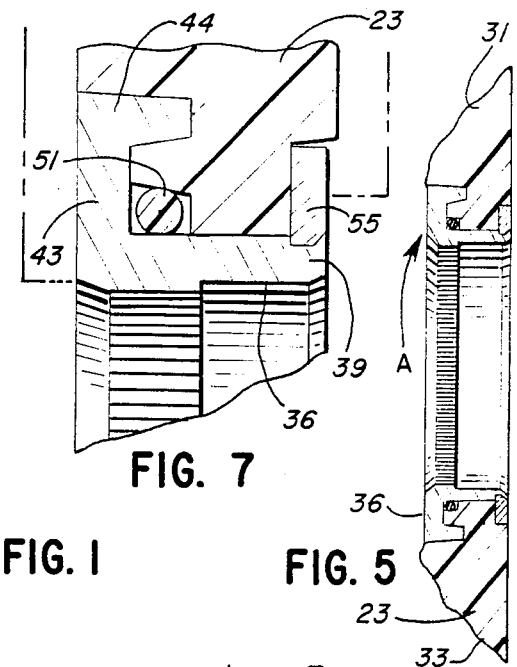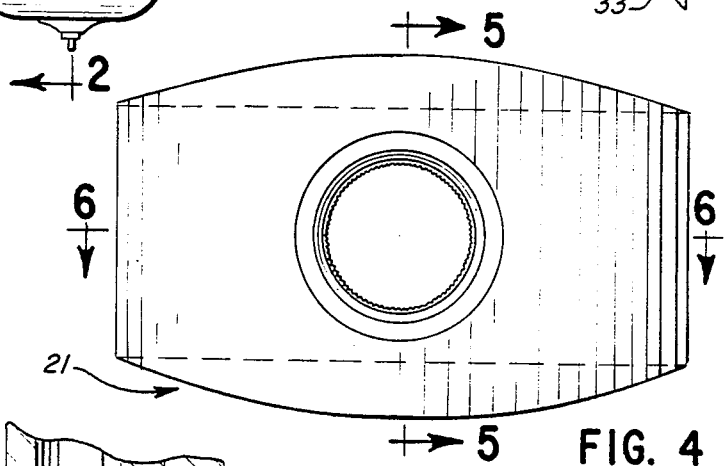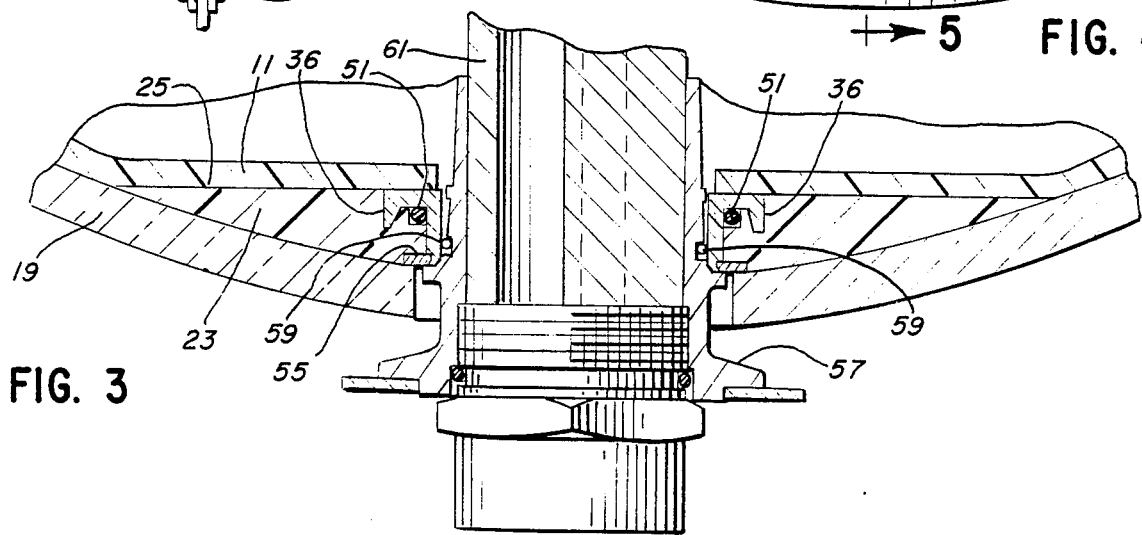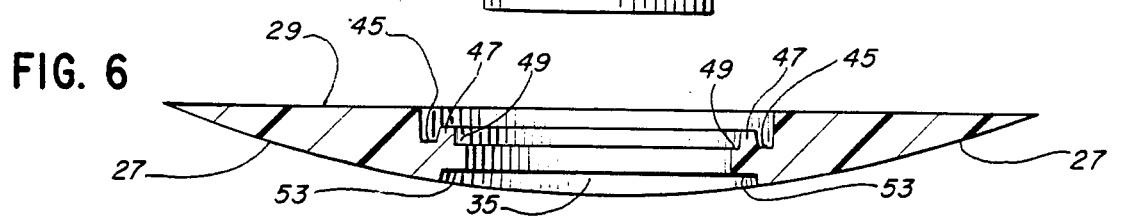

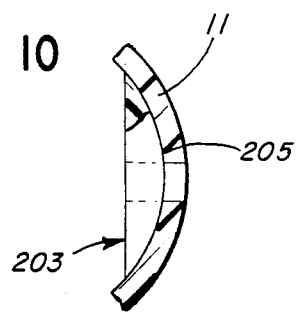
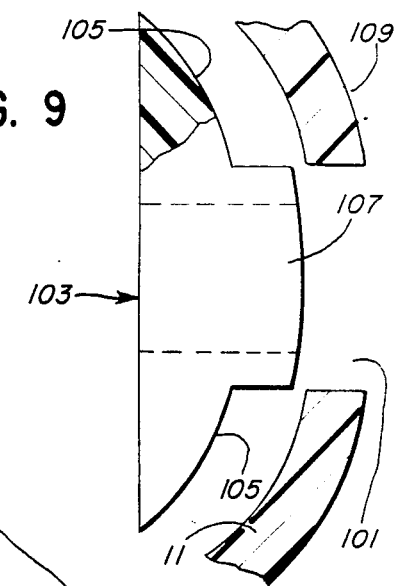
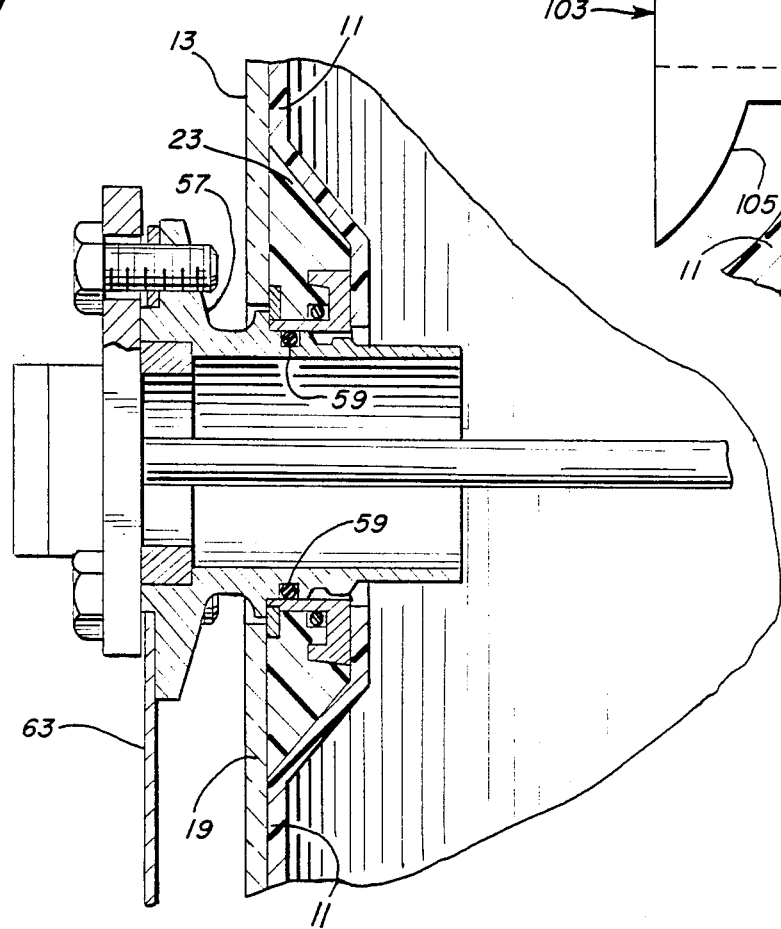
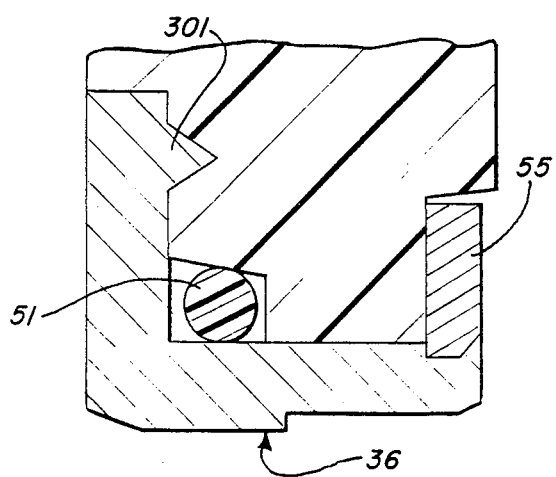
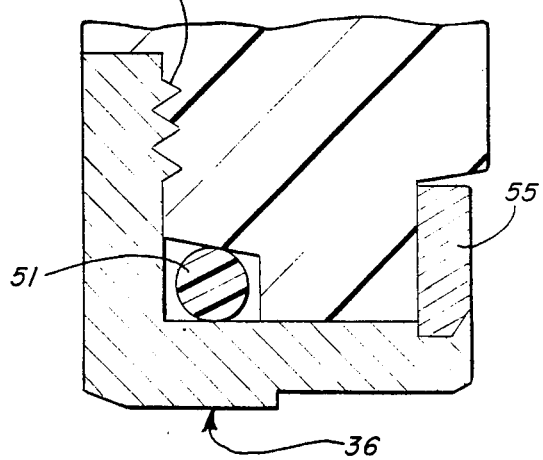

PRESSURE VESSEL WITH AN IMPROVED SIDEWALL STRUCTURE

BACKGROUND OF THE INVENTION

This application is a continuation-in-part of application Ser. No. 822,921, filed Jan. 24, 1986 for a "Pressure Vessel With An Improved Sidewall Structure." Application Ser. No. 822,921 is a continuation of application Ser. No. 612,239, filed May 21, 1984, which is a continuation-in-part of application Ser. No. 447,769, filed Jan. 24, 1983 for a "Plastic Shell Construction For A Pressure Tank And Method For Manufacturing Same."

FIELD OF THE INVENTION

The present invention relates to a pressure vessel used to contain fluids at high pressures and temperatures and having thin thermoplastic sidewalls with at least one localized area of increased thickness. More particularly, the invention relates to an insert forming a localized area of increased thickness in the thin thermoplastic sidewalls of a pressure vessel and defining a leak-proof port through the localized area of increased thickness.

DESCRIPTION OF THE PRIOR ART

Most prior art pressure vessels used to contain various corrosive and non-corrosive fluids at high pressures and temperatures are massive metal structures. Since these vessels have thick and heavy sidewall structures, they can easily accommodate ports that adequately support various fittings without leakage. However, the size and weight of these structures limits their use to commercial or heavy-duty industrial applications. Frequently, their manufacture is difficult and expensive.

Other prior art pressure vessels which overcome the disadvantages of these massive metal vessels suffer from other disadvantages. These vessels have composite outer shells of continuously wound glass filaments impregnated with a thermosetting resinous material and inner liners made of plastic material. Their sidewalls are relatively thin and light, making them easy to handle and construct.

However, attempting to form a port for supporting a fitting in the middle sidewall of such a thin-walled plastic vessel presents significant and serious problems. First, the thin sidewall does not have sufficient material thickness for a properly threaded bore and accordingly cannot directly receive a threaded fitting. Any seal between a fitting and the annular surface of a port in the sidewall of such a vessel is weak and easily broken or cracked by even slight contact with the external portion of the fitting. Moreover, the sidewall itself is weak in the area of a port and may fracture or fail. Finally, the materials, used to construct the sidewalls of these vessels, have high coefficients of thermal expansion. Consequently, any port formed through the sidewalls will greatly vary in size as the temperature of the vessel's contents and, accordingly, of the material forming the sidewalls varies. The fitting placed within the port is typically of a material, such as metal, which is different than the material of the sidewalls. The fitting material has a coefficient of thermal expansion different and lower than that of the material of the sidewall. Thus, the material of the fitting and the material of the sidewall expand and contract at different rates, causing the fitting to separate from the sidewall material and resulting in a leak or even structural damage.

Therefore, as an initial consideration, the sidewall structure circumjacent a port must have sufficient material thickness, strength and rigidity to adequately support a fitting. It must also have a stable configuration regardless of the coefficient of expansion of the sidewall material and the fitting material to maintain a leakproof seal with the fitting.

The structure of the insert of the present invention avoids the problems outlined above. It increases the thickness, strength and rigidity of a portion of a pressure vessel sidewall to allow the sidewall to accommodate a port which can adequately support a fitting. It also provides leakproof communication with the inside of the vessel regardless of the difference in the coefficient of expansion of the sidewall material and the fitting material.

The pressure vessel comprises a thin thermoplastic inner liner, an insert means and an outer layer. The insert of the present invention comprises a structural or main body member having an opening or aperture through its center. The body member is adhered to the inner liner, and a filament wound outer layer covers a substantial portion of the inner liner and insert. The opening through the structural body member communicates with openings in the inner liner and outer layer to form a port through the sidewall of the vessel. A fitting is positioned in the opening of the structural body member. The fitting cooperates with the body member to form a seal and restrains the expansion of the body member at increasing temperature to maintain the seal. Due to the fitting and its cooperation with the body member, as the temperature rises, the tendency of the body member to expand and pull away from the fitting is restrained, thereby maintaining a seal between the fitting and the body member.

SUMMARY OF THE INVENTION

It is a general object of this invention to provide a structural insert for a thin-walled pressure vessel which has at least one localized area of increased thickness in the wall of the vessel.

It is another object of this invention to provide a structural insert which adds material thickness, strength and rigidity to the walls of a thin-walled pressure vessel while defining a port that is capable of receiving and supporting various devices such as heating elements, thermostats and pipes.

It is another object of this invention to provide a pressure vessel including an insert with a fitting which provides leakproof communication with the inside of the vessel, notwithstanding the difference in expansion and contraction between the fitting and the insert material caused by differing coefficients of thermal expansion in the two different materials and by fluctuations in the temperature of the vessel's contents.

Other objects, advantages and features of the present invention will become apparent upon reading the following detailed description and appended claims, and upon reference to the accompanying drawings.

In the preferred embodiment of the present invention, a pressure vessel for containing fluids has an improved structural insert for increasing the thickness of a portion of a pressure vessel's sidewalls and providing a leakproof port. The vessel which includes this insert comprises a hollow shell having an elongate cylindrical body and substantially hemispherically shaped top and bottom portions. The hollow shell comprises an inner liner made of a suitable thermoplastic material and an outer layer or shell which covers the inner liner and provides strength, rigidity and structural integrity to the vessel. The cylindrical portion of this outer shell comprises a layer of glass filaments bound by a resinous material to each other and to the inner lining.

In the preferred embodiment, the inner liner has a recess or pocket formed in the cylindrical middle portion. This pocket projects inwardly into the interior of the vessel. The insert lies in the recess or pocket of the inner liner, bound between the inner liner and outer shell, and substantially fills the recess. The outer surface of the insert is substantially contiguous with the outer surface of the inner liner; and the overall outer surface of the middle portion of the inner liner, including the outer surface of the insert, forms a substantially smooth surface. While the preferred embodiment discloses a single recess or pocket and a single insert, the vessel may have multiple recesses and inserts. These multiple recess and inserts may lie in any desirable pattern over the surface of the inner liner.

As stated above, the insert lies between the inner lining and outer shell at a predetermined location, secured in place at that location by blow-molding or otherwise bonding it to the inner liner and by constructing the resin impregnated, glass filament shell over it. The insert produces an increased sidewall thickness at the predetermined location. With this increased material thickness, the sidewall can accommodate a port for leakproof communication with the inside of the pressure vessel. The insert includes a main body member having an opening through its center and a fitting or collar assembly secured to the main body portion and lining the wall area of the opening.

Like the inner liner, the main body member is a thermoplastic material which is impervious and which resists high temperatures and the corrosive action of chemicals. The opening in the main body member communicates with an opening in the inner liner and outer shell to form a port through the sidewall of the pressure vessel.

The fitting includes a collar portion which lines the walls of the opening in the main body member and which has enhanced strength and rigidity to support devices such as pipes and other adaptor fittings. It also has a low coefficient of thermal expansion compared to that of the main body member to provide a port having dimensions which vary only a small amount as the temperature of the fluids contained in the vessel varies. Such a stable port may consistently receive adaptor fittings, which have similar material characteristics as the collar assembly, without leaking the fluids contained in the vessel. A suitable material for this fitting may be any industrial metal or other material which has the characteristics outlined above.

The fitting also includes a return flange which engages the main body member at one end of the opening. This flange and a resilient O-ring, which lies around the collar assembly, are positioned on opposite sides of a protuberance or extension of the main body member and form a seal between the collar and the main body member. In place between the collar and the main body member, the O-ring serves as a compression ring. The return flange functions as a stop or restraint to prevent the extension of the main body member from expanding during increasing temperatures and pulling away from the collar assembly and thus maintains the seal between the collar and the main body member. Finally, the insert includes a ring formed from a suitable material such as metal and secured around the collar at the end of the opening opposite the end with the return flange. This ring locks the collar in place in the opening of the main body member.

BRIEF DESCRIPTION OF THE DRAWINGS

For a more complete understanding of this invention, one should now refer to the embodiment illustrated in greater detail in the accompanying drawings and described below by way of an example of the invention. In the drawings:

FIG. 1 is a side elevation view of a pressure vessel of the present invention.

FIG. 2 is a sectional view taken along line 2—2 of FIG. 1 and through the insert of the present invention.

FIG. 3 is a sectional view taken along line 3—3 of FIG. 1 through the insert and showing a fitting in place through the port in the insert.

FIG. 4 is a plan view of the outer surface of the insert of the present invention.

FIG. 5 is a sectional view taken along line 5—5 of FIG. 4.

FIG. 6 is a sectional view taken along line 6—6 of FIG. 4 without the collar assembly.

FIG. 7 is an enlarged view of detail A in FIG. 5.

FIG. 8 is a sectional view taken along line 8—8 of FIG. 1 through the insert and showing a fitting in place through the port in the insert and a plate connected to the fitting with bolts for securing the fitting in place.

FIG. 9 is a sectional view, showing a modified insert.

FIG. 10 is a sectional view, showing another modified insert.

FIG. 11 is a sectional view, showing a modified insert fitting or collar.

FIG. 12 is a sectional view, showing another modified insert collar.

While the following text describes the invention in connection with a preferred embodiment, one should understand that the invention is not limited to this embodiment. Furthermore, one should understand that the drawings are not necessarily to scale.

DETAILED DESCRIPTION OF THE DRAWINGS AND THE PREFERRED EMBODIMENT

Turning now to the drawings, FIGS. 1 and 2 show a pressure vessel generally at 10. The vessel 10 is a cylindrical tank capable of containing various fluids at high pressures and temperatures. It comprises a hollow shell having an elongate cylindrical body and substantially hemispherically shaped top and bottom portions. The hollow shell includes an inner liner 11 made of a suitable thermoplastic material such as polybutylene. Alternatively, this inner liner 11 may also be any other high strength, impervious material that resists high temperatures and the corrosive action of chemicals. The inner liner 11 is the inside layer of the vessel 10, and it has the same general shape as the outside surface of the vessel as described above.

The vessel 10 also includes an outer shell 13 which covers the inner lining 11 and provides strength, rigidity, and structural integrity to the vessel 10. This outer shell 13 includes two generally hemispherical caps 15 and 17 that cover the two domed ends of the inner lining 11. It also includes a sleeve 19 disposed around the cylindrical portion of the inner lining 11 and at least partially covering the end caps 15 and 17. This sleeve is a layer of glass filaments bound by a resinous material to each other and to the lining 11. In addition to serving as the cylindrical outer shell of the vessel, the sleeve 19 secures the caps 15 and 17 to the inner lining 11. The caps 15 and 17 can be metallic and the sleeve 19 comprises a layer of glass filaments wound around the inner lining 11 and bound together and to the lining 11 by a resinous material. However, the caps 15 and 17 as well as the sleeve 19 can be made from various other materials. Pending U.S. patent application Ser. No. 822,921 describes the pressure vessel more fully, and its disclosure is incorporated herein by reference.

The thin inner liner 11 is made from a thermoplastic material in a blow molding or other suitable process and includes at least one recess 25 which protrudes inwardly into the interior of the vessel. The walls of the recess are substantially the same thickness as the thickness of the inner liner 11. The maximum depth of the recess 25 is substantially greater than the thickness of the inner liner 11. Of course, additional recesses formed in any pattern about the inner liner 11 can be made to meet specific needs.

To provide localized areas of increased thickness in the cylindrical middle portion, the tank includes an insert 21 disposed in recess 25 of the plastic inner liner 11. The structural insert 21 is adhered to the wall of the recess and substantially fills the recess. The top surface of the insert 21 is contiguous with the top surface of the inner liner 11 and together form a substantially smooth curved surface. The insert 21 and the inner liner 11 form an integral structure which provides increased thickness in the sidewalls of the vessel structure and together with the outer liner or layer 13 allow the vessel to accommodate a port which receives various adaptor fittings such as heating elements, thermostats and pipes generally shown at 26.

As shown in FIGS. 3-7, the insert 21 includes a main body member 23 having a size and shape which allows it to fill the recess or depression 25. Like inner liner 11, the member 23 is made from a thermoplastic material such as polybutylene or any other high strength, impervious material that resists high temperatures and the corrosive action of chemicals. The member 23 has a generally rounded or curved outer surface 27 with substantially the same curvature as the cylindrical portion of the inner liner. Thus, when placed in the recess 25, the outer surface of the member 23 is substantially flush with the outer surface of the inner liner 11. The main body member 23 has a generally flat inner surface 29 which intersects the rounded outer surface 27 in straight edges on the sides of the member. It also has sloping top and bottom surfaces 31 and 33, respectively, which intersect the rounded outer surface to form a rounded edge at the top and bottom of the member 23. The top and bottom surfaces and the inner surface of the insert have rows of ridges formed into them to facilitate bonding with the inner liner. The overall shape of the insert is not limited to that described above and can take any form desired provided that the insert substantially fills the recess in the inner liner and thereby provides a thickened section.

The member 23 has an opening 35 formed through its center. This opening communicates with openings in the inner liner 11 and outer shell 13 to form a port through the sidewall of the vessel. When forming the opening in the outer shell 13, the manufacturer may use a patch or other reinforcing means (not illustrated) to restrain the glass filaments from unraveling and to distribute the forces from cut filaments to uncut filaments.

In addition to the main body member 23, the insert 21 includes a collar or fitting 36. The fitting 36 has enhanced strength and rigidity for supporting devices such as pipes and other adaptor fittings. It also has a low coefficient of thermal expansion compared to the main body member to define a port having dimensions which vary only slightly due to the temperature of the confined liquid in the vessel. Such a stable port can consistently receive various adaptor fittings having material characteristics similar to those of fitting 36 without leaking the fluid contained in the vessel. Preferably, the fitting 36 is made from a metallic material or any material with the characteristics outlined above.

The fitting or collar 36 includes a substantially cylindrical lining portion 39 which lines the opening 35 in the member 23 and a radically extending restraining member or return flange 43. The return flange 43 has the cross-sectional shape of an inverted "L". Although the preferred embodiment includes a return flange with an inverted L shape, the return flange may have any shape which allows it to function as a stop in the manner described below. This return flange engages the main body member 23 in a grove or annular seat 45 circumjacent the opening 35 to stop or restrain the annular protuberance 47 from expanding as the temperature increases and pulling away from O-ring 51 and collar 36 (see FIG. 7).

The opening 35 has an irregular wall surface, as shown in FIG. 6, including an annular seat or groove 45 for receiving a lip 44 of flange 43, an annular protuberance 47, an annular step or shoulder 49 for receiving a resilient O-ring or gasket 51 made from a compressible material such as rubber, and an annular seat 53 for receiving a locking ring 55. The fitting 36 coacts with the walls of opening 35 and the O-ring 51 to provide a leak-proof seal between itself and the member 23.

Referring to FIG. 7, the annular protuberance 47 and O-ring 51 lie between the lip 44 of the flange 43 and the lining portion 39 of the fitting 36. The space between the lining portion 39 and the lip 44 is smaller than the combined thickness of the protuberance 47 and the O-ring 51. Thus, the O-ring 51 is in radial compression and in pressure contact with the body member 23 and fitting 36 to provide a tight seal between the two. The protuberance 47 engages the lip 44 which acts as a stop to keep the O-ring 51 in compression.

The body member 23 has a coefficient of thermal expansion which is substantially higher than the coefficient of thermal expansion of the material used to construct the fitting 36. Moreover, since the temperature of the vessel's contents varies over a wide range, the temperature of the vessel's sidewalls, including body member 23, varies accordingly. Therefore, member 23 expands and contracts appreciably as its temperature increases and decreases. When the body member 23 expands, the compressive force on the O-ring 51 tends to decrease, but lip 44 prevents protuberance 47 from moving away from collar 36, thus maintaining a seal between the collar and the member 23. When the body member 23 contracts it increases the compressive force on the O-ring to further improve the seal which the O-ring 51 provides.

To lock the fitting 36 in place, the insert includes the metal ring 55 locked into a trapezoidal seat 56 at one end of the collar portion 39. The ring 55 engages step 53 of member 23 to lock the fitting 36 in place. It may be metallic or any other material of high strength and rigidity.

As shown in FIGS. 3 and 8, the fitting 36 receives an adaptor fitting or attachment 57 such as a pipe, heating element, thermostat, sensor or the like. The adaptor fitting 57 is made from a material similar to the material used to construct fitting 36. The connection between the other fitting 57 and the fitting 36 may be made by expansion of the adaptor in a bayonet-type mount shown in these figures. An O-ring 59 forms a seal between the two fittings. This connection may also be a conventional threaded connection or any other known connection. As shown in FIG. 3, the adaptor may receive a screw plug heating element 61. As shown in FIG. 8, the adaptor may also receive an alternative flange mounted type of heating element 63.

To construct the insert 21 and secure it in place in the sidewall of a pressure vessel, the maker molds, using conventional molding methods, the main body member 23 with the opening configuration shown in FIG. 6. The maker then places the O-ring in its seat and forces the fitting 36 in place. To lock this collar in place, the maker then places ring 55 in its seat. The maker can then place the insert in its seat in the cylindrical portion of the vessel's inner liner and blow-mold or otherwise bond or adhere the insert to the liner using conventional methods to form an integral unit. Finally, the maker may construct the outer shell of the vessel by winding glass filaments around the inner liner 11 and impregnating them with resin.

The insert of the present invention can have a wide variety of shapes, and one can secure this insert to the thin thermoplastic inner liner 11 a number of ways, provided that the result is a localized thickened area which forms an integral part of the inner liner and provided that the fitting which forms a part of the insert restrains the thermoplastic main body portion of the insert from pulling away from the fitting at increasing temperature.

In an alternative embodiment shown in FIG. 9, the cylindrical portion of the thin thermoplastic inner liner 11 has an aperture 101 instead of a recess or pocket as described in the preferred embodiment. The inner liner 11 can be extruded or blow molded of thermoplastic material. The insert 103 performs the same function as the insert 21 described in the preferred embodiment and can, of course, take any geometric shape desired. The insert 103 includes a collar or fitting identical to collar 36. The outer surface or peripheral portion 105 of the insert 103 has a curved or sloping shoulder which abuts against the interior curved surface of the inner liner 11. The central portion 107 of the insert 103 fits into the aperture 101 of the inner liner 11, substantially filling the aperture and forming a substantially smooth curved surface with the outer surface 109. The manufacturer adheres or otherwise secures the insert 103 in this position, and constructs the remaining portion of the pressure vessel as described above.

In another alternative embodiment, as shown in FIG. 10, the cylindrical portion of the thin thermoplastic inner liner 11 does not initially have an aperture. The inner liner 11 can be extruded or otherwise formed of thermoplastic material. The insert 203 performs the same function as insert 21 described in the preferred embodiment and can, of course, take any geometric shape desired. It includes a collar or fitting identical to collar 36, and it has a curved or sloping surface 205 which abuts against the interior curved surface of the inner liner 11. After the manufacturer bonds the insert 203 to the inner liner 11 by any known technique such as the use of adhesive, he forms an aperture in the inner liner 11 to coincide with the aperture in the insert 203. The manufacturer constructs the remaining portions of the pressure vessel as described above.

The embodiments of FIGS. 11 and 12 are alternatives to the collar or fitting 36 and provide a modified spike element 301 (FIG. 11) and a saw tooth structure 401 (FIG. 12) for the collar 36. These are alternatives to the "L" shaped flange member 43 including lip 44 and prevent the main body member 23 from moving apart from collar 36. The spike 301 when inserted into the main body member 23 displaces material increasing the compression of O-ring 51. Both the spike and saw tooth member assert an axial force which restrains the main body member from expanding in a radial direction at increasing temperatures. The remaining parts of the insert are identical to that discussed above.

Thus, the applicants have provided a pressure vessel having an improved insert which forms a localized area of increased thickness in the sidewalls of the thin-walled pressure vessel and together with the inner liner and outer layer allows the vessel to have a port through its sidewall. The insert is a simple structural component having a port with walls of sufficient strength and rigidity which provides leak-proof communication between the inside and outside of the pressure vessel. This insert comprises a main body member defining an opening through its center, a fitting which lines the walls of the opening in the body member and which has flange means to restrain or stop the main body member from expanding at increasing temperatures and pulling away from the collar and the O-ring disposed between the lining portion of the fitting and the main body member. The interconnection between the fitting and the main body member restrains or stops differential expansion between the main body member and the fitting at increasing temperature to maintain a leak proof seal between the two members.

While the applicants have shown only a few embodiments of the invention, one will understand of course, that the invention is not limited to these embodiments since those skilled in the art to which the invention pertains may make modifications and other embodiments of the principles of this invention, particularly upon considering the foregoing teachings. For example, the opening defined by the main body member and the fitting secured in it may have different configurations than those shown. The applicants, therefore, by the appended claims intend to cover any such modifications and other embodiments as incorporate those features which constitute the essential features of this invention.

What is claimed is:

1. A pressure vessel for containing fluids, said pressure vessel comprising: a thin thermoplastic inner liner providing an impervious barrier to said fluids and having first and second end portions and a substantially cylindrical middle portion connected to said end portions, said cylindrical middle portion having at least one aperture; an insert means secured to said thin inner liner, forming an integral part thereof; an outer layer substantially covering said inner liner and having an aperture substantially coincident with said aperture of said inner liner, said insert means comprising: a main body member having an aperture, said main body aperture being substantially coincident with said aperture in said inner liner and said aperture in said outer layer and forming a port into the interior of said vessel; collar means positioned in said aperture of said main body member for forming a seal therebetween and connected to said main body member for restraining said main body member from expanding away from said collar means due to increasing temperature.

2. A pressure vessel for containing fluids as set forth in claim 1, wherein said insert means forms a substantially smooth, curved surface with the outer surface of said inner liner; and said collar means further comprises compression means positioned between a portion of said collar means and a portion of said main body member for providing a seal therebetween and restraining means engaging said main body member for maintaining said seal by restraining said portion of said main body member from expanding away from said compression means due to increasing temperature.

3. A pressure vessel for containing fluids as set forth in claim 2, wherein said collar means further comprises a substantially cylindrical lining portion positioned within the aperture of said main body member; said restraining means extending radially from one end of said lining portion; said main body member having an annular groove circumjacent said main body aperture for receiving a portion of said restraining means, said main body member also having an annular shoulder recess spaced inward from said annular groove forming a protuberance from said main body member between said groove and said shoulder recess; said compression means in compression in said annular shoulder recess of said main body member for forming a seal between said collar means and said protuberance of said main body member.

4. A pressure vessel for containing fluids as set forth in claim 3, wherein said restraining means stops said protuberance of said main body member from expanding at increasing temperature thereby maintaining said compression means in compression.

5. A pressure vessel for containing fluids as set forth in claim 4, wherein said collar means of said insert means further comprises a locking means positioned at the opposite end from said restraining member for securing together said collar means and said main body member.

6. A pressure vessel for containing fluids as set forth in claim 1, wherein said collar means of said insert comprises a substantially cylindrical lining portion positioned within the aperture of said main body member, and a restraining member extending radially from one end of said lining portion and connected to said main body member; said main body member having an annular shoulder recess; said insert means further comprising compression means in compression in said annular shoulder recess of said main body member for forming a seal between said collar means and said main body member.

7. A pressure vessel for containing fluids as set forth in claim 6, wherein said restraining member axially restrains said main body member from expanding in a radial direction at increasing temperature thereby maintaining said compression means in compression.

8. A pressure vessel for containing fluids as set forth in claim 7, wherein said collar means of said insert means further comprises a locking means positioned at the opposite end from said restraining means for securing together said collar means and said main body member.

9. A pressure vessel for containing fluids, said pressure vessel comprising: a thin thermoplastic inner liner forming a container which is impervious to said fluids, said container having a substantially cylindrical middle portion, first and second end portions, said end portions being connected with said cylindrical middle portion, a segment of said thin inner liner disposed inward to define at least one recess in said container, said recess having a depth which extends from the outer surface of said container to the bottom of said recess and which is at its maximum greater than the wall thickness of said cylindrical middle portion of said thin inner liner; an insert means positioned within and substantially filling said recess and adhered to the walls of said recess for forming a thickened section, said thickened section being an integral part of said thin inner liner and having a maximum thickness greater than the wall thickness of said cylindrical middle portion of said thin inner liner; an outer layer bound to and covering a substantial portion of said inner liner and covering said insert means for providing added strength and forming a rigid, integral vessel with said inner liner and insert means; a port extending through a segment of said outer layer and said insert means and a segment of said inner liner for providing access to the interior of said vessel; said insert means having a main body member through which said port extends and a collar means positioned in said port; compression means positioned between said collar means and a portion of said main body member for forming a seal; said collar means connected to said main body member for maintaining said seal and restraining said portion of said main body member from expanding away from said compression means due to increasing temperature.

10. A pressure vessel for containing fluids as set forth in claim 9, wherein said collar means further comprises restraining means engaging said main body member for maintaining said seal and restraining said portion of said main body member from expanding away from said compression means due to increasing temperature.

11. A pressure vessel for containing fluids as set forth in claim 10, wherein said collar means further comprises a substantially cylindrical lining portion positioned within the aperture of said main body member; said restraining means extending radially from one end of said lining portion; said main body member having an annular groove circumjacent said main body aperture for receiving a portion of said restraining means, said main body member also having an annular shoulder recess spaced inward from said annular groove forming a protuberance from said main body member between said groove and said shoulder recess; said compression means in compression in said annular shoulder recess of said main body member for forming a seal between said collar means and said protuberance of said main body member.

12. A pressure vessel for containing fluids as set forth in claim 11, wherein said restraining means stops said protuberance of said main body member from expanding at increasing temperature thereby maintaining said compression means in compression.

13. A pressure vessel for containing fluids as set forth in claim 12, wherein said collar means of said insert means further comprises a locking means positioned at the opposite end from said restraining member for securing together said collar means and said main body member.

14. A pressure vessel for containing fluids as set forth in claim 9, wherein said collar means of said insert means comprises a substantially cylindrical lining portion positioned within the aperture of said main body member, and a restraining member extending radially from one end of said lining portion and connected to said main body member; said main body member having an annular shoulder recess; said compression means in compression in said annular shoulder recess of said main body member for forming a seal between said collar means and said main body member.

15. A pressure vessel for containing fluids as set forth in claim 14, wherein said restraining member axially restrains said main body member from expanding in a radial direction at increasing temperature thereby maintaining said compression means in compression.

16. A pressure vessel for containing fluids as set forth in claim 15, wherein said collar means of said insert means further comprises a locking means positioned at the opposite end from said restraining means for securing together said collar means and said main body member.

17. A pressure vessel for containing fluids, said pressure vessel comprising: a thin thermoplastic inner liner providing an impervious barrier to said fluids and having first and second end portions and a substantially cylindrical middle portion having at least one aperture and being connected to said first and second end portions; an insert means secured to said inner liner forming an integral part thereof, said insert means substantially filling said aperture and forming a substantially smooth curved surface with the outer surface of said inner liner; an outer layer substantially covering said insert means and said inner liner and having an aperture substantially coincident with said aperture of said inner liner, said insert comprising: a main body member having a first coefficient of thermal expansion and having an aperture, said main body aperture being substantially coincident with said aperture in said inner liner and said aperture in said outer layer and forming a port into the interior of said vessel; collar means having a second coefficient of thermal expansion and positioned in said aperture of said main body member forming a seal therebetween and connected to said main body member for restraining said main body member from expanding away from said collar means due to increasing temperature and the difference between said first and second coefficients of thermal expansion, said first coefficient of thermal expansion being different from said second coefficient of thermal expansion.

18. A pressure vessel for containing fluids as set forth in claim 17, wherein said collar means further comprises compression means positioned between a portion of said collar means and a portion of said main body member for providing a seal therebetween and restraining means engaging said main body member for maintaining said seal and restraining said portion of said main body member from expanding away from said compression means due to increasing temperature.

19. A pressure vessel for containing fluids as set forth in claim 18, wherein said collar means further comprises a substantially cylindrical lining portion positioned within the aperture of said main body member; said restraining means extending radially from one end of said lining portion; said main body member having an annular groove circumjacent said main body aperture for receiving a portion of said restraining means, said main body member also having an annular shoulder recess spaced inward from said annular groove forming a protuberance from said main body member between said groove and said shoulder recess; said compression means in compression in said annular shoulder recess of said main body member for forming a seal between said collar means and said protuberance of said main body member.

20. A pressure vessel for containing fluids as set forth in claim 19, wherein said restraining means stops said protuberance of said main body member from expanding at increasing temperature thereby maintaining said compression means in compression.

21. A pressure vessel for containing fluids as set forth in claim 20, wherein said collar means of said insert means further comprises a locking means positioned at the opposite end from said restraining means for securing together said collar means and said main body member.

22. A pressure vessel for containing fluids as set forth in claim 17 wherein said collar means of said insert means comprises a substantially cylindrical lining portion positioned within the aperture of said main body member, and a restraining means extending radially from one end of said lining portion and connected to said main body member; said main body member having an annular shoulder recess; compression means in compression in said annular shoulder recess of said main body member for forming a seal between said collar means and said main body member.

23. A pressure vessel for containing fluids as set forth in claim 22, wherein said restraining means axially restrains said main body member from expanding in a radial direction at high temperature thereby maintaining said compression means in compression.

24. A pressure vessel for containing fluids as set forth in claim 23, wherein said collar means of said insert means further comprises a locking means positioned at the opposite end from said restraining means for securing together said collar means and said main body member.

* * * * *